(12) United States Patent
Le et al.

(10) Patent No.: US 11,713,817 B2
(45) Date of Patent: Aug. 1, 2023

(54) BALANCED ACTIVATION FORCE AND BISTABLE VALVE SYSTEM AND METHOD

(71) Applicant: FLUIDMASTER, INC., San Juan Capistrano, CA (US)

(72) Inventors: Tuan Le, Fountain Valley, CA (US); Joseph Han, Irvine, CA (US)

(73) Assignee: FLUIDMASTER, INC., San Juan Capistrano, CA (US)

( * ) Notice: Subject to any disclaimer, the term of this patent is extended or adjusted under 35 U.S.C. 154(b) by 32 days.

(21) Appl. No.: 17/341,341

(22) Filed: Jun. 7, 2021

(65) Prior Publication Data

US 2021/0364093 A1    Nov. 25, 2021

Related U.S. Application Data

(63) Continuation of application No. 16/151,292, filed on Oct. 3, 2018, now abandoned.

(Continued)

(51) Int. Cl.
*F16K 3/24*     (2006.01)
*F16K 27/04*    (2006.01)
*F16K 3/34*     (2006.01)

(52) U.S. Cl.
CPC .............. *F16K 3/243* (2013.01); *F16K 3/34* (2013.01); *F16K 27/041* (2013.01)

(58) Field of Classification Search
CPC .......... F16K 3/243; F16K 3/34; F16K 27/041; F16K 7/17

See application file for complete search history.

(56) References Cited

U.S. PATENT DOCUMENTS 1,536,424 A * 5/1925 Cowley ................. B65G 51/16
                                                         251/33
2,180,320 A * 11/1939 Hansen ................. F16K 31/385
                                                         137/635

(Continued)

FOREIGN PATENT DOCUMENTS

EP    1217275 B1    9/2004
FR    1410927 A     9/1965

OTHER PUBLICATIONS

Korean Intellectual Property Office, International Search Report and Written Opinion for International Application No. PCT/US2018/054266, dated Jan. 15, 2019, 13 pages, Republic of Korea.

*Primary Examiner* — Daphne M Barry
(74) *Attorney, Agent, or Firm* — Greenberg Traurig, LLP

(57) ABSTRACT

Some embodiments include a valve assembly with a metering seal including a main channel including regions with a first diameter and regions with a second diameter, where the first diameter is smaller than the second diameter. Some embodiments include a stem positioned in the metering seal extending from at least a first end of the metering seal to a second end of the metering seal. In some embodiments, the stem has a fluted section positioned between two non-fluted sections, where the diameter of stem in the fluted section is smaller than the diameter of the stem in the non-fluted sections. Some embodiments include a first and second flow channel extending across at least a partial width of the metering seal, where the first flow channel is positioned at the first end of the metering seal, and the second flow channel is positioned at the second end of the metering seal.

19 Claims, 8 Drawing Sheets

Related U.S. Application Data

(60) Provisional application No. 62/567,734, filed on Oct. 3, 2017.

(56) References Cited

U.S. PATENT DOCUMENTS

| | | | |
|---|---|---|---|
| 2,747,611 A | | 5/1956 | Hewitt |
| 2,892,644 A | * | 6/1959 | Collins ............... F16K 11/0712 251/324 |
| 3,240,128 A | * | 3/1966 | Wilson .................. F16K 31/402 92/99 |
| 5,277,222 A | | 1/1994 | Clarke |
| 6,748,970 B2 | * | 6/2004 | Keller ..................... E03C 1/052 251/41 |
| 10,571,040 B2 | * | 2/2020 | Babb .................. F16K 31/0658 |
| 2006/0096637 A1 | | 5/2006 | Maquaire |
| 2008/0308757 A1 | | 12/2008 | Nakai et al. |
| 2010/0163766 A1 | | 7/2010 | Alvarez |
| 2014/0352828 A1 | * | 12/2014 | Landrum .............. F16K 11/044 137/625.48 |

\* cited by examiner

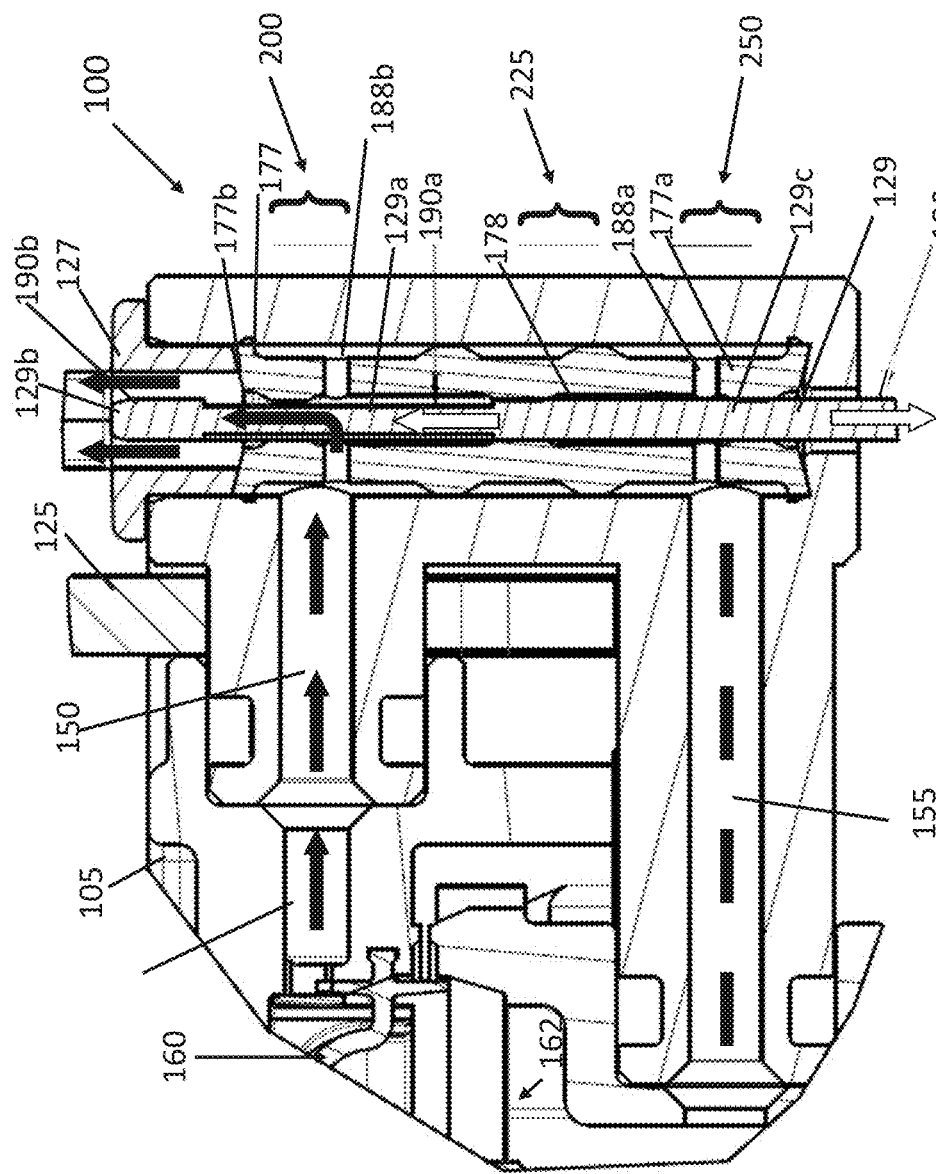

BALANCED ACTIVATION FORCE AND BISTABLE VALVE SYSTEM AND METHOD

RELATED APPLICATIONS

This application is a continuation of U.S. application Ser. No. 16/151,292, filed on Oct. 3, 2018, which claims priority to U.S. provisional application Ser. No. 62/567,734, filed on Oct. 3, 2017, the entire contents of which are incorporated herein by reference.

BACKGROUND

Conventional valves generally require biasing devices to provide digital on and off control while providing low activation energy independent of inlet pressures with bistable on/off functions.

SUMMARY OF THE INVENTION

A valve assembly comprising a metering seal comprising a main channel, the main channel including regions with a first diameter and regions with at least a second diameter, where the first diameter is smaller than the second diameter. Some embodiments include a stem positioned in the metering seal extending from at least a first end of the metering seal to a second end of the metering seal. In some embodiments, the stem comprises a fluted section positioned between two non-fluted sections, where the diameter of stem in the fluted section is smaller than the diameter of the stem in the non-fluted sections. Some embodiments include a first and second flow channel extending across at least a partial width of the metering seal, where the first flow channel is positioned at the first end of the metering seal, and the second flow channel is positioned at the second end of the metering seal.

Some embodiments include a first flow channel extending to and coupling with the main channel. In some embodiments, the second flow channel extend to and couples with the main channel. Some embodiments comprise a lower flow channel extending to and coupled to the first flow channel. Some embodiments further comprise an upper flow channel extending to and coupled to the second flow channel.

In some embodiments, the lower flow channel extends from at least one of a fluid supply and an actuable valve, where the actuable valve is configured to at least partially open and close to control passage of fluid to the lower flow channel.

In some embodiments, the upper flow channel extends from at least one of a fluid supply and an actuable valve, where the actuable valve is configured to at least partially open and close to control passage of fluid to the upper flow channel. In some embodiments, at least a portion of one or more of the non-fluted sections comprises a diameter dimensioned to couple with the metering seal in the main channel in regions that comprise the second diameter.

Some embodiments include at least a partial seal or fluid-tight seal that is formed by the coupling of the one or more of the non-fluted sections coupling with the metering seal in the main channel in regions that comprise the second diameter.

In some embodiments, the stem is positioned in the main channel so that at least a portion of the fluted section is coupled with or proximate a region of the main channel comprising the second dimeter. In some embodiments, the stem is positioned in the main channel as an arrangement with at least a portion of the fluted section being at least one of coupled with, proximate to, and fluidly coupled to the second flow channel, the arrangement configured to enable fluid flow between the main channel and the second flow channel.

In some embodiments, the stem is positioned in the main channel as an arrangement with at least a portion of the non-fluted section being at least one of coupled with, and proximate to the second flow channel, where the arrangement is configured to at least partially prevent fluid flow between the main channel and the second flow channel.

In some embodiments, the stem is positioned in the main channel as an arrangement with at least a portion of the fluted section being at least one of coupled with, proximate to, and fluidly coupled to the second flow channel, where the arrangement is configured to enable fluid flow out of the main channel adjacent the second end of the metering seal.

Some embodiments comprise at least one gap between the inner surface of metering seal and the outer surface of the stem, where the gap is configured and arranged to enable fluid to communicate from a lower chamber of an adjacent valve to an upper chamber of an adjacent valve to bring the pressure in the upper chamber up to the pressure in the lower chamber.

In some embodiments, the stem comprises a bistable state held in a position in the main channel by friction between one or more of the non-fluted sections and an internal surface of the main channel comprising the first diameter. In some embodiments, the position of the stem enables a fluid coupling of the first and second flow channels and the main channel.

Some embodiments include an assembly comprising a valve assembly comprising a flow control side and a metering side, where the flow control side comprises valve separating a lower chamber and an upper chamber, and the valve is configured and arranged to control fluid flow between the flow control side and the metering side. In some embodiments, the metering side comprises a metering seal comprising a main channel, where the main channel includes regions with a first diameter and regions with at least a second diameter, and where the first diameter is smaller than the second diameter.

Some embodiments include a stem positioned in the metering seal extending from at least a first end of the metering seal to a second end of the metering seal, where the stem comprises a fluted section positioned between two non-fluted sections, and where the diameter of stem in the fluted section is smaller than the diameter of the stem in the non-fluted sections.

In some embodiments, the first and second flow channels extending across at least a partial width of the metering seal, and the first flow channel is positioned at the first end of the metering seal, and the second flow channel positioned at the second end of the metering seal.

Some embodiments comprise a lower flow channel extending to and coupled to the first flow channel, and an upper flow channel extending to and coupled to the second flow channel, where the first and second flow channels extend to and couple with the main channel.

Some embodiments comprise a lower flow channel extending between the flow control side and the metering side and coupled to the first flow channel, and an upper flow channel extending between the flow control side and the metering side and coupled to the second flow channel.

Some embodiments comprise at least one gap between the inner surface of metering seal and the outer surface of the stem, where the gap is configured and arranged to enable fluid to communicate between the lower chamber and the upper chamber via the metering seal.

Some embodiments include a valve stem control method comprising providing at least one metering seal and stem assembly, where the at least one metering seal and stem assembly comprising a plurality of sealing zones. Some embodiments provide a balanced fluidic pressure to the at least one metering seal and stem assembly, where the fluidic pressure is substantially balanced to substantially cancel a force acting and/or inducing momentum of at least a portion of the stem assembly.

In some embodiments, the plurality of sealing zones comprises three sealing zones of the at least one metering seal. In some embodiments, the plurality of sealing zones enables at least one of an on function or position of a valve and an off function or position of a valve. In some embodiments, the stem comprises a bistable condition when exposed to two equal and opposite fluid forces at the on and off functions or positions, where the bistable condition enables a digital selection of the on function or position of a valve and/or the off function or position of a valve.

Some embodiments include an on function or position, the plurality of sealing zones comprises a middle zone with two zones at each end, the two zones being exposed to atmospheric pressure, wherein a seal of the middle zone is closed, and an upper seal zone of the two zones is opened to depressurize. In some embodiments, with an off function or position, the stem is moved so that a middle zone of the plurality of zones is open and the two zones are sealed closed.

Some embodiments include a fluid control method comprising providing a fluted stem positioned in a metering seal, where the fluted stem is positioned in the metering seal to substantially cancel two equal and opposite fluid forces fluid forces acting on generally opposite ends of the metering stem. Further, by positioning and dimensioning the stem to form a fluidically sealed middle zone enabling a digital selection of the on function or position and/or the off function or position of the valve. In some embodiments, the bistable on/off condition is produced solely as a result of the two equal and opposite fluid forces.

DESCRIPTION OF THE DRAWINGS

FIG. 5A depicts an enlarged view of a portion of the valve of FIG. 4 according to some embodiments of the invention.

DETAILED DESCRIPTION

Figure 1:
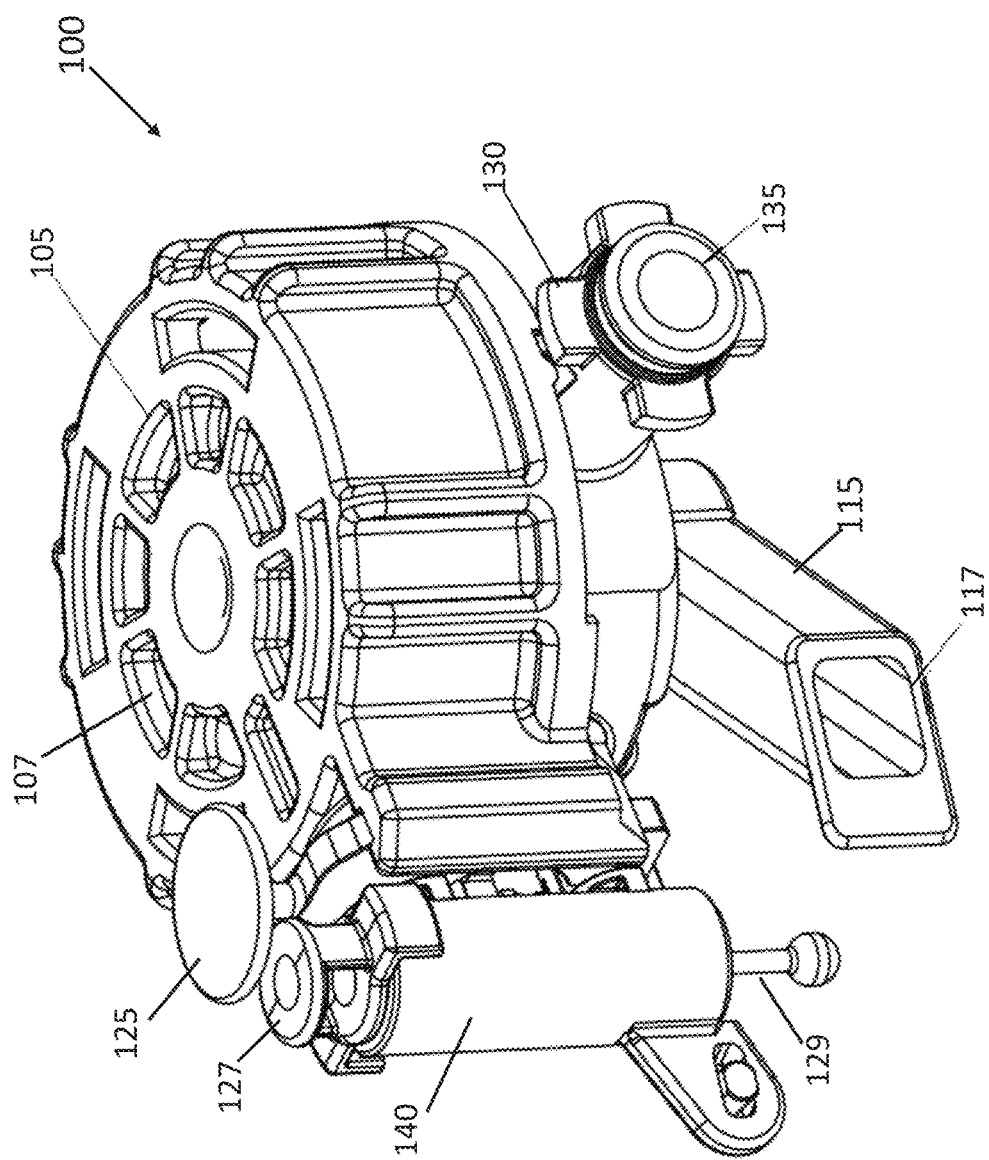
FIG. 1 shows a perspective view of a valve assembly in accordance with some embodiments of the invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

Some embodiments of the invention provide a valve capable of relatively high flow rates at relatively low pressures. Some embodiments provide a valve capable of bistable on/off conditions without relying on bias devices, which simplifies the mechanism. Further, some embodiments include a low activation valve which is substantially independent of inlet pressures. For example, FIG. 1 shows a perspective view of a valve assembly 100 in accordance with some embodiments of the invention. In some embodiments, the valve assembly 100 comprises a valve cap 105 including at least one aperture 107. Further, in some embodiments, the valve assembly 100 can comprise a coupled valve body 130 including a fluid inlet 135. In some embodiments, the valve assembly 100 can comprise a fluid outlet body 115 including a fluid outlet 117. Some embodiments include structure couplings or elements 125, 127 adjacent or coupled to a housing 140 at least partially enclosing a metering seal 177 (shown in FIGS. 2, 3A-3D, 4, and 5A-5B).

Figure 2:
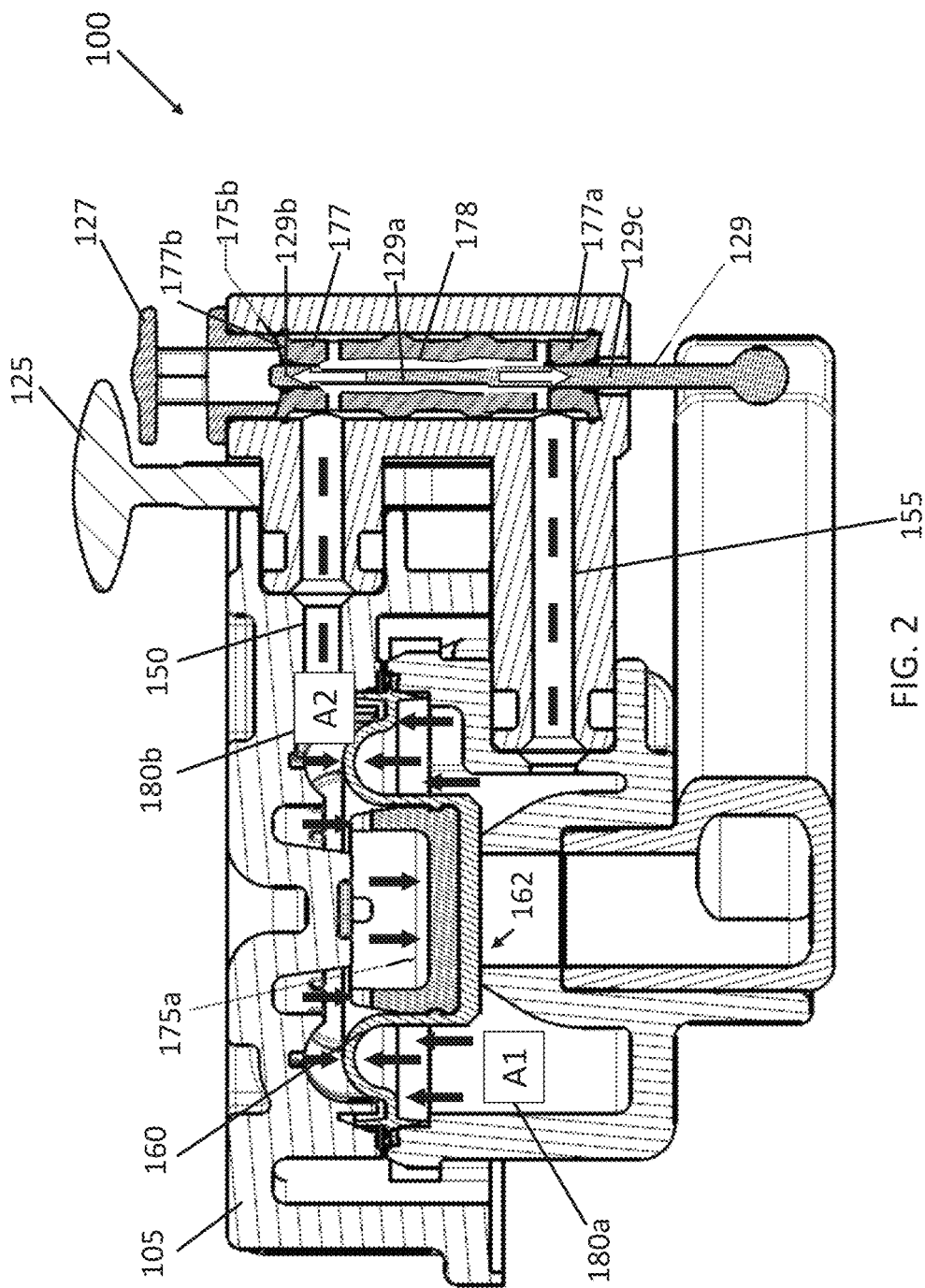
FIG. 2 shows a cross-section of the valve assembly of FIG. 1 in a closed position according to one embodiment of the invention.

FIG. 2 shows a cross-section of the valve assembly 100 of FIG. 1 in a closed position according to one embodiment of the invention. FIG. 3 depicts an enlarged cross-sectional view of a portion of the valve assembly 100 of FIG. 1 according to some embodiments of the invention. As illustrated, some embodiments include a valve assembly architecture that is divided into two different sides, the flow control side (shown as 175*a*), and the metering side (shown as 175*b*). In some embodiments, at least a portion of the valve assembly architecture of the valve assembly 100, including the flow control side 175*a*, and/or the metering side 175*b* can be coupled or integrated into the valve assembly 100 to control one or more functions of the valve assembly 100 (e.g., such as turning a valve of the valve assembly on and off).

Referring to FIG. 2, in some embodiments of the invention, the flow control side 175*a* can include a valve 162 with flexible diaphragm 160 with its upper chamber A2 (marked as 180*b*) and lower chamber A1 (marked as 180*a*) (see FIG. 1). In some embodiments, the upper chamber 180*b* can comprise a larger area than the lower chamber 180*a*. In this instance, when it is pressurized to a pressure equal to the inlet pressure of the lower chamber 180*a*, the net force on the diaphragm 160 can push the diaphragm 160 down to a closed position.

In some embodiments, the both upper chamber 180*b* and lower chamber 180*a* can be in fluid communication with the metering side 175*b*. For example, in some embodiments, both the upper chamber 180*b* and lower chamber 180*a* are in communication with the metering side 175*b* through fluid channels. In some embodiments of the invention, the metering side 175*b* can comprise two main components, a stem 129 with different zones and flutes corresponding to three different sealing zones, zone 200, zone 225, and zone 250 of the metering seal 175*b*. In some embodiments, the lower chamber 180*a* can be coupled to the metering side 175*b* at a location between the sealing zone 225 and zone 250 via a flow channel (180*a*). In some embodiments, the upper chamber 180*b* can be coupled to the metering side 175*b* at the location between the sealing zone 225 and zone 200 via another flow channel (upper flow channel 150).

Figure 3A:
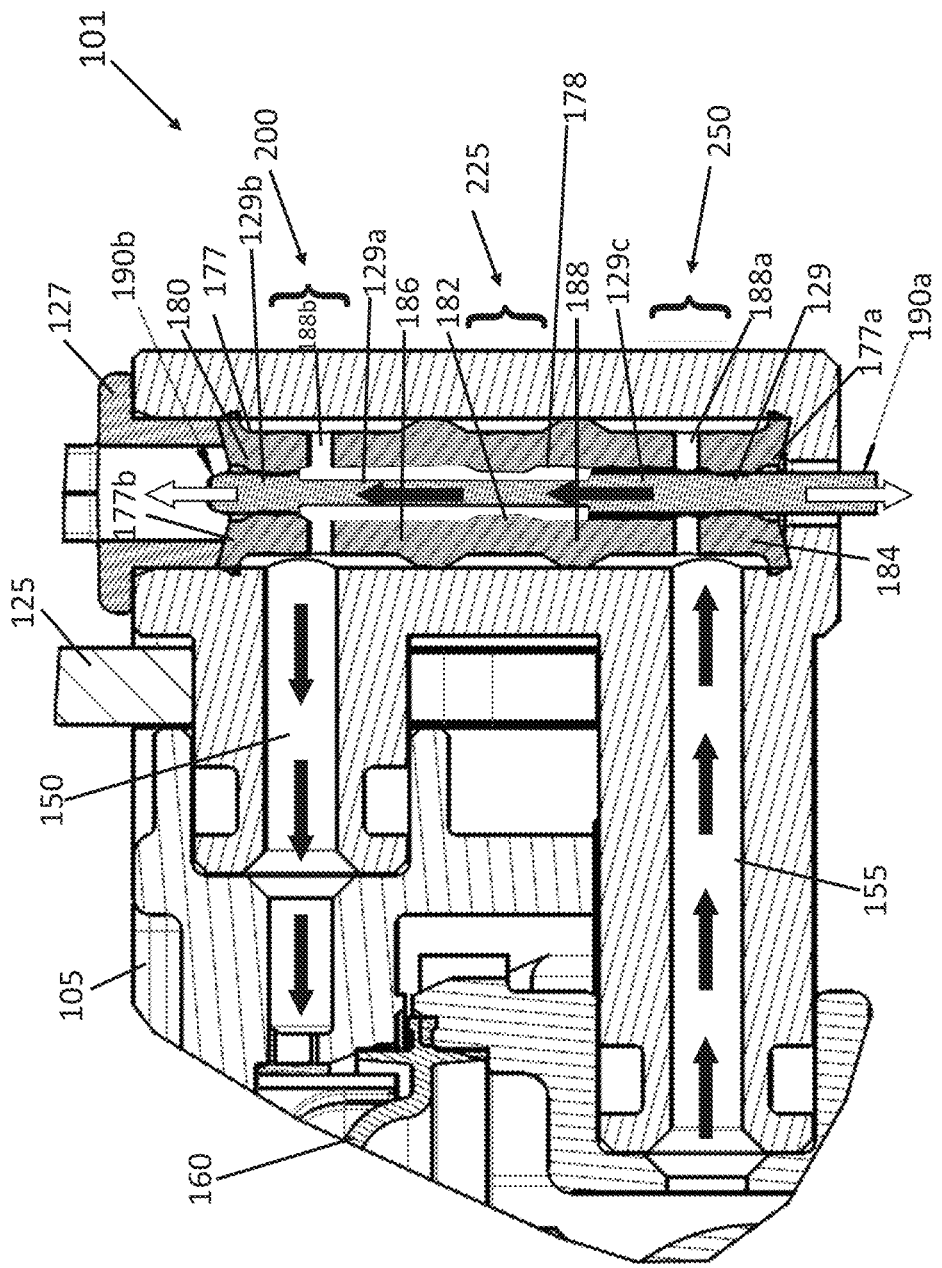
FIG. 3A depicts an enlarged cross-sectional view of a portion of the valve assembly of FIG. 1 according to some embodiments of the invention.
Figure 3C:
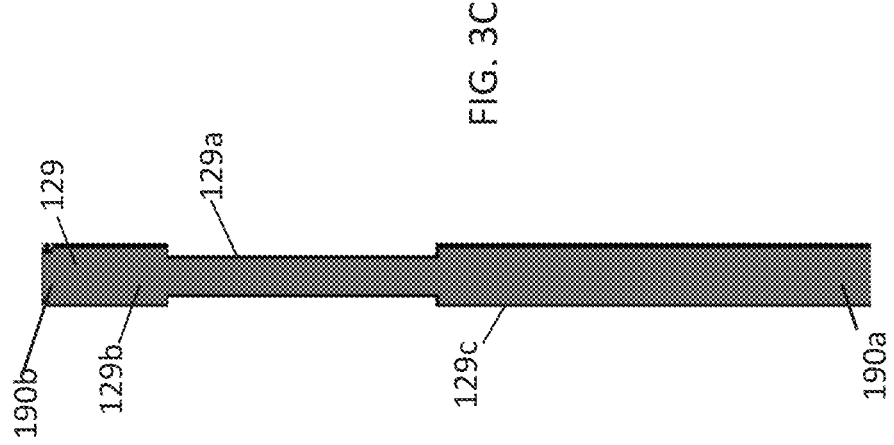
FIG. 3C illustrates a stem of the metering seal of FIG. 3B of the valve assembly of FIG. 1 in accordance with some embodiments of the invention.
Figure 3B:
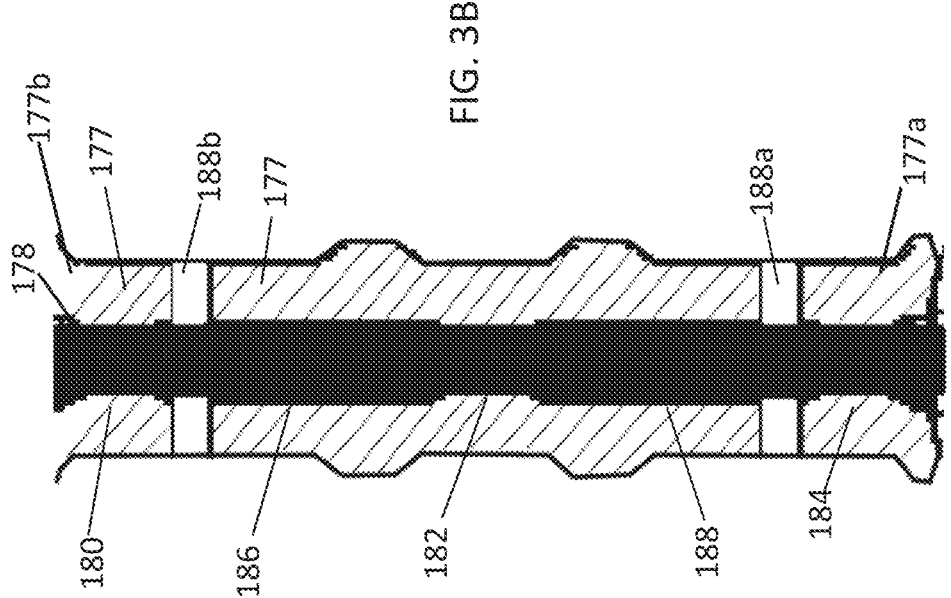
FIG. 3B illustrates a metering seal of the valve assembly of FIG. 1 in accordance with some embodiments of the invention.
Figure 3D:
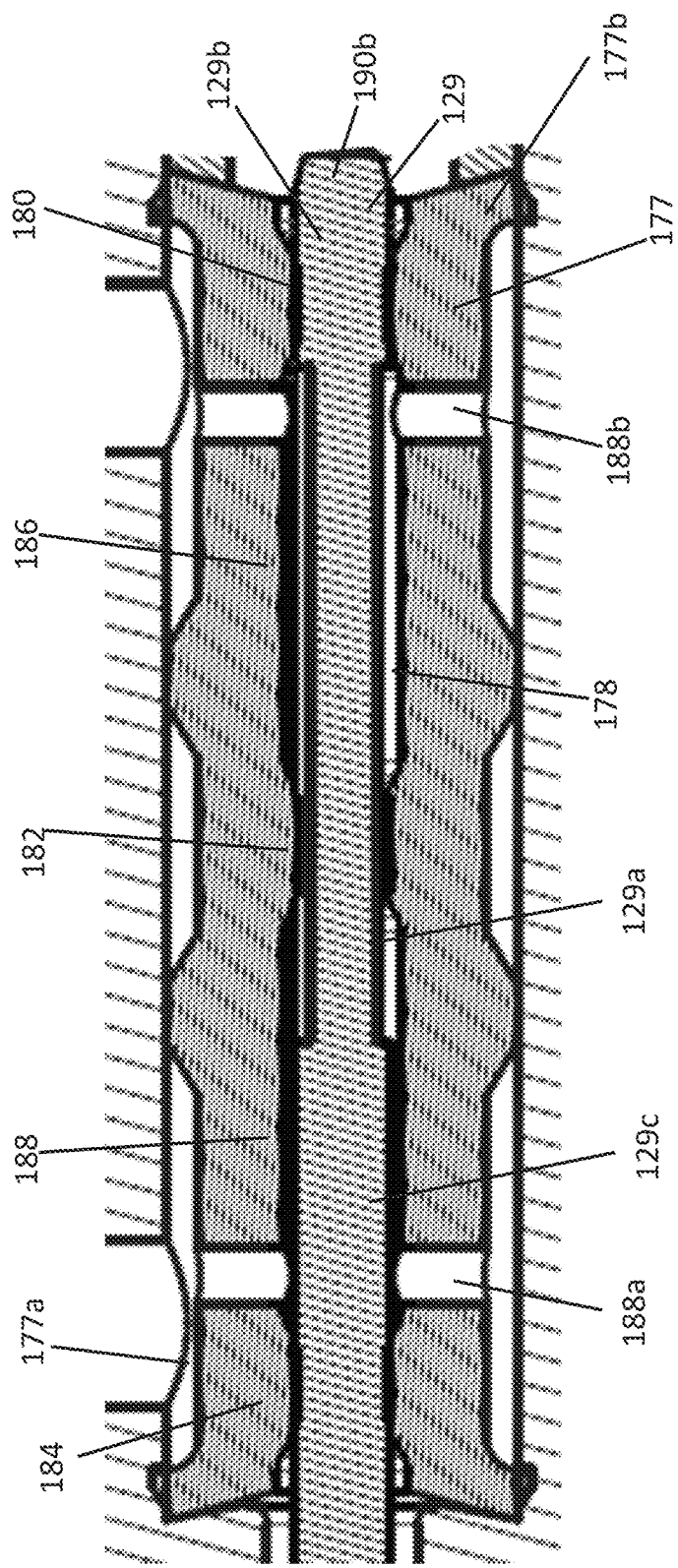
FIG. 3D illustrates a partial cross-section of a portion of the metering seal with stem of FIG. 3A in accordance with some embodiments of the invention.

In some embodiments of the invention, a moveable stem 129 can be positioned within the metering seal 177, with the stem 129 extending between at least a first end 177*a* of the metering seal 177 and the second end 177*b* of the metering seal 177. In some embodiments of the invention, the moveable stem 129 can be moved within the metering seal 177 (i.e., back and forth between at least the first end 177*a* and second end 177*b* of the metering seal 177) to provide control over fluid flow between the flow control side 175*a* and the metering side 175*b*. FIGS. 3B and 3C provide more details of structure of the moveable stem 129 and metering seal 177. For example, FIG. 3B illustrates a metering seal 177 of the valve assembly 100 of FIG. 1 in accordance with some embodiments of the invention, and FIG. 3C illustrates a stem 129 of the metering seal 177 of FIG. 3B of the valve assembly 100 of FIG. 1 in accordance with some embodiments of the invention. Referring to the metering seal 177 of FIG. 3B, in some embodiments, the metering seal 177 can comprise a main channel 178 into which the stem 129 of FIG. 3C can reside or be inserted. In some embodiments, the main channel 178 can vary in diameter through at least a partial length of the metering seal 177, where in some regions, the diameter is approximate to the diameter of at least a portion of the metering seal 177 so that an at least partial fluid seal or fluid-tight seal can be formed while the stem 129 remains moveable within the metering seal 177. Thus, in some embodiments, the diameter of the main channel 178 and the maximum diameter of any portion of the stem 129 are not so close that the stem 129 cannot be inserted into the metering seal 177, and the stem 129 does not become immobile in the metering seal 177 or the main channel 178 of the metering seal 177. For example, in one non-limiting embodiment, the metering seal 177 can comprise regions 180, 182, 184 where the diameter of the main channel 178 is narrower than regions 186, 188.

In some embodiments, the diameter (i.e., a first diameter) of the main channel 178 within at least a portion of regions of any two or more of the regions 180, 182, 184 can be the same or substantially the same. Further, the diameter (i.e., a second diameter) of the main channel 178 within at least a portion of regions of the regions 186, 188 can be the same or substantially the same. Further, as illustrated, the first diameter (of the channel 178) is smaller than the second diameter (of the channel 178).

Further, in some embodiments, the metering seal 177 can comprise channels that extend across at least a partial length of a diameter of the metering seal 177. For example, some embodiments include a first channel 188*a* at a first end 177*a* of the metering seal 177 (i.e., in the region of the zone 250). Further, some embodiments include a second channel 188*b* at a second end 177*b* of the metering seal 177 (i.e., in the region of the zone 200). In some embodiments, either one or both of the first and second channels 188*a*, 188*b* can extend to and fluidly couple with the main channel 178 of the metering seal 177.

Turning to FIG. 3C, the stem 129 can comprise a fluted section 129*a* between sections 129*b*, 129*c* extending to or proximate each end of the stem 129. For example, the section 129*c* can extend from one end of the fluted section 129*a* towards the first end 190*a* of the stem 129, and the section 129*b* can extend from the opposite end of the fluted section 129*a* towards a second end 190*b* of the stem 129. In this instance, one or more of the sections 129*b*, 129*c* can comprise a diameter such that a partial fluid seal or fluid-tight seal can be formed with one or more of the narrower regions 180, 182, 184 of the metering seal. For example, in some embodiments, the stem 129 can be moved down in the main channel 178 (i.e. towards the end of the valve assembly 100 with fluid outlet body 115) so that a sealing zone on the stem 129 comprising the section 129*b* can form a partial fluid seal or fluid-tight seal with region 180 of the metering seal 177 at the sealing zone 200 of the metering seal 177 to prevent fluid from bleeding to atmosphere and concurrently. In this instance, the flutes section of the stem (129*a*) is at the sealing zone 225 of the metering seal 177 where the fluted section 129*a* is positioned within the region 182 of the metering seal 177, providing a gap that can allow fluid to communicate from the lower chamber 180*a* to the upper chamber 180*b* (via lower flow channel 155 and upper flow channel 150). This structure is represented in FIG. 3A, and in this instance, allows the valve assembly 100 to bring the pressure in the upper chamber 180*b* up to the pressure in the lower chamber 180*a*.

In reference to FIG. 2, in some embodiments of the invention, a net force can be created due to the area difference between chamber 180*b* and 180*a* that can cause the diaphragm 160 to be pushed down to close the valve 162. In some embodiments, fluid pressure can be applied on the stem at two generally opposite locations, one near the sealing zone 200 and one near the sealing zone 250. Since the diameter of the stem 129 at zone 200 (section 129*b* of the stem 129) is equal to diameter at zone 250 (section 129*c* of the stem 129), the net force on the stem 129 due the fluid pressure can be substantially equal to zero. The only force on the stem 129 at this position can be frictional force with the metering seal 177 (e.g., through contact with one or more of regions 180, 182, and 184 of the metering seal 177) to maintain this stem 129 position. Therefore, the frictional force is the only force required to move the stem from the off position to the on position.

Figure 4:
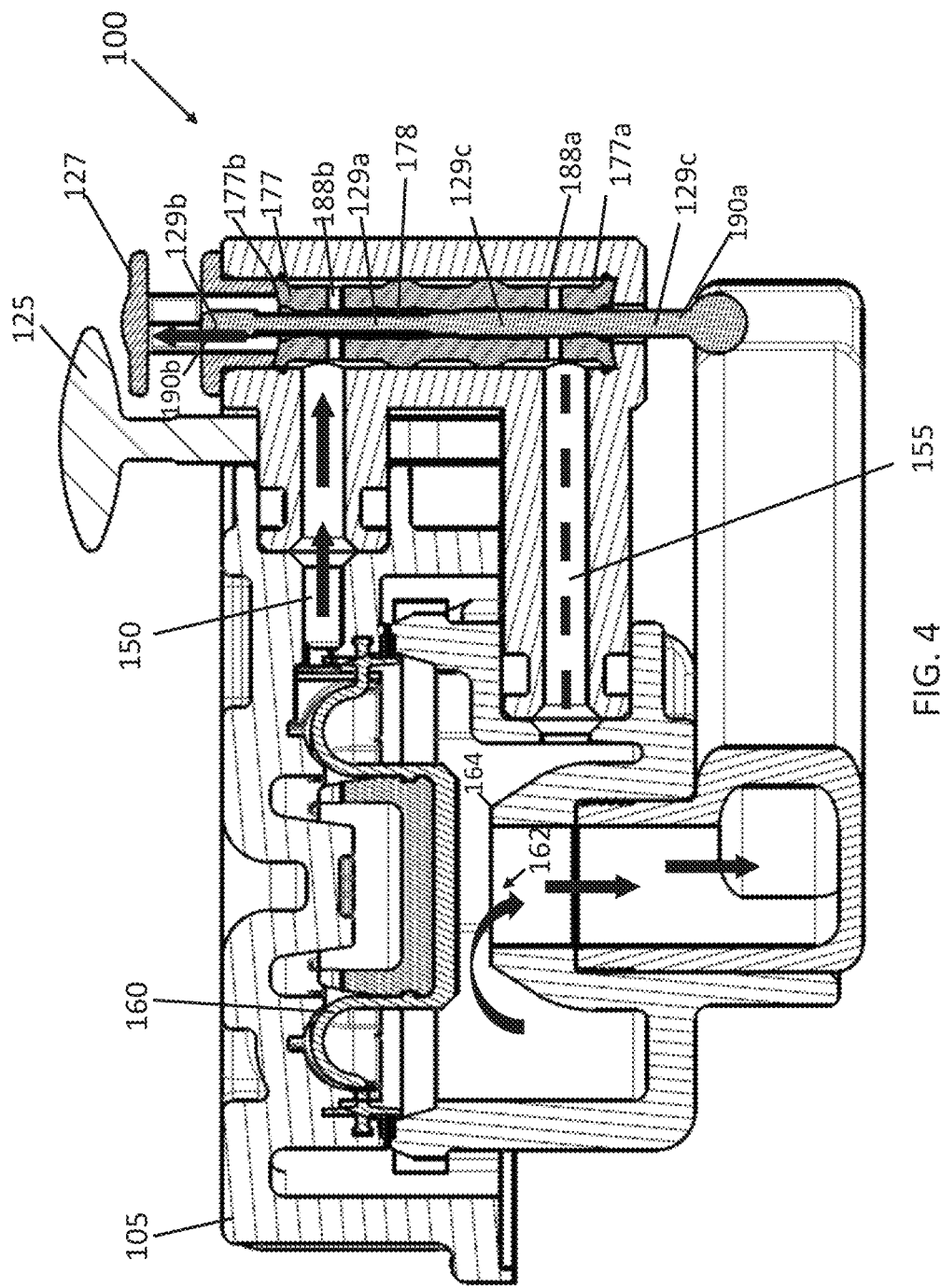
FIG. 4 shows a cross-section of a valve in an open position according to one embodiment of the invention
Figure 5B:
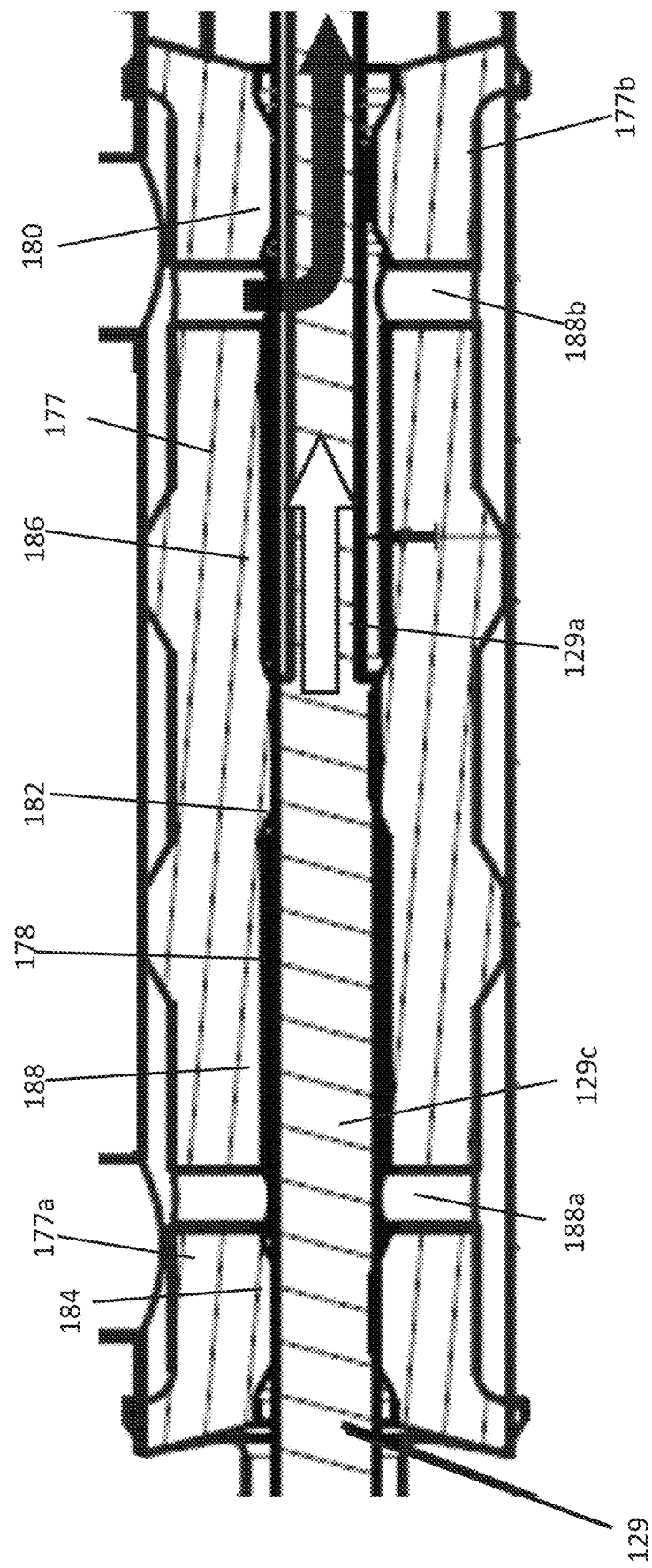
FIG. 5B illustrates a partial cross-section of a portion of the metering seal with stem of FIG. 5A in accordance with some embodiments of the invention.

FIG. 4 shows a cross-section of a valve in an open position according to one embodiment of the invention. Further, FIG. 5A depicts an enlarged view of a portion of the valve of FIG. 4 according to some embodiments of the invention, and FIG. 5B illustrates a partial cross-section of a portion of the metering seal with stem of FIG. 5A shown to provide clarity of the position of the stem 129 in the metering seal 177.

In some embodiments of the invention, the stem 129 can be moved up so that its sealing zone is away from the sealing zone 200 of the metering seal 177. In this instance, the flutes (section 129a) on the stem can allow fluid in the upper chamber 180b to be bled out to atmosphere while another sealing zone on the stem is sealed off by the sealing zone 225. This can cause the upper chamber 180b to be depressurized and cause a net force on the diaphragm 160 of valve 162 of the flow control side 175a. This can enable the diaphragm 160 of valve 162 to be forced away from the sealing surface 164, and enabling fluid flow to take place (show as arrows toward fluid outlet body 115.

In another embodiment of the invention, a valve can include only the metering side 175b such as shown in partial assembly 101 of FIG. 3A without using the flow control side 175a. In some embodiments, by enlarging the flow paths (such as upper and lower flow channels 150, 155), enough flow rate to be generated for the valve to operate satisfactorily. In some embodiments, both sides (upper and lower flow channels 150, 155) that feed into this valve embodiment can be connected to a common inlet of a fluid supply. In this instance, a balanced force and bistable condition is preserved, and the only force to overcome during the activation is frictional force between the stem 129 and metering seal 177. In some embodiments, in the partial assembly 101 or assembly 100, only low forces are needed to actuate the valve, enabling valve actuation to be powered by batteries, by solar power, or other low voltage and current sources.

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the description and figures, as well as in the following claims.

The invention claimed is:

1. A valve assembly comprising:
a stem comprising a fluted section;
a valve cap including at least one aperture,
a coupled valve body including a fluid inlet,
a fluid outlet body including a fluid outlet, and
a housing at least partially enclosing a metering seal;
wherein the valve assembly is divided into two sides;
wherein the two sides include a flow control side and a metering side;
wherein the flow control side includes a valve with a diaphragm positioned between an upper chamber and a lower chamber; and
wherein both the upper chamber and the lower chamber are in fluid communication with the metering side.

2. The valve assembly of claim 1,
wherein the metering side comprises the housing.

3. The valve assembly of claim 1,
wherein the valve is configured such that when the upper chamber is pressurized to a pressure equal to an inlet pressure of the lower chamber, a net force pushes the diaphragm down to a closed position.

4. The valve assembly of claim 1,
wherein the metering seal comprises a first channel and a second channel that each extend across at least a partial length of a diameter of the metering seal.

5. The valve assembly of claim 1,
wherein the metering seal comprises a first channel and a second channel that each extend across at least a partial diameter of the metering seal and the housing.

6. The valve assembly of claim 1,
wherein the metering seal comprises a main channel; and
wherein the main channel comprises a varying diameter through at least a partial length of the metering seal.

7. The valve assembly of claim 6,
wherein the varying diameter creates narrower regions forming sealing zones configured to form at least a partial fluid seal with a stem.

8. The valve assembly of claim 7,
wherein the metering seal comprises at least three different sealing zones.

9. The valve assembly of claim 1,
further comprising a stem;
wherein moving the stem within the metering seal provides flow control between the flow control side and the metering side.

10. The valve assembly of claim 1,
wherein the valve assembly is configured such that the fluted section on the stem allows fluid in the upper chamber to be bled out to atmosphere while at least one sealing zone and the stem creates a seal.

11. The valve assembly of claim 1,
wherein the valve assembly is configured such that the fluted section on the stem allows fluid in the upper chamber to be depressurized.

12. The valve assembly of claim 11,
wherein depressurizing the upper chamber causes the diaphragm to be forced away from a sealing surface.

13. A valve assembly comprising:
a stem comprising a fluted section, and
a housing at least partially enclosing a metering seal;
wherein the metering seal comprises a main channel; and
wherein the main channel comprises a varying diameter through at least a partial length of the metering seal.

14. The valve assembly of claim 13,
wherein the metering seal comprises a first channel and a second channel that each extend across at least a partial diameter of the metering seal.

15. The valve assembly of claim 13,
wherein the valve assembly is configured such that the fluted section on the stem allows fluid to be bled out to atmosphere while at least one sealing zone and the stem creates a fluid seal.

16. The valve assembly of claim 13,
wherein the varying diameter creates narrower regions forming sealing zones configured to form at least a partial fluid seal with a stem.

17. The valve assembly of claim 16,
wherein the metering seal comprises at least three different sealing zones.

18. The valve assembly of claim 13,
wherein the valve assembly is divided into two sides; and
wherein the two sides include a flow control side and a metering side.

19. The valve assembly of claim 18,
further comprising a stem;
wherein moving the stem within the metering seal provides flow control between the flow control side and the metering side.

\* \* \* \* \*